(12) United States Patent  
Wolterink et al.

(10) Patent No.: US 9,213,169 B2  
(45) Date of Patent: Dec. 15, 2015

(54) OPTICAL UNIT

(75) Inventors: Edwin Maria Wolterink, Valkenswaard (NL); Yelena Vladimirovna Shulepova, Eindhoven (NL)

(73) Assignee: Anteryon International B.V. (NL)

( * ) Notice: Subject to any disclaimer, the term of this patent is extended or adjusted under 35 U.S.C. 154(b) by 323 days.

(21) Appl. No.: 13/812,689

(22) PCT Filed: Jul. 5, 2011

(86) PCT No.: PCT/NL2011/050479
§ 371 (c)(1),
(2), (4) Date: Jul. 11, 2013

(87) PCT Pub. No.: WO2012/015297
PCT Pub. Date: Feb. 2, 2012

(65) Prior Publication Data
US 2013/0278810 A1    Oct. 24, 2013

(30) Foreign Application Priority Data
Jul. 28, 2010   (NL) ..................................... 2005164

(51) Int. Cl.
*G02B 9/00*     (2006.01)
*G02B 13/00*    (2006.01)

(52) U.S. Cl.
CPC .......... *G02B 13/0075* (2013.01); *G02B 13/003* (2013.01); *G02B 13/006* (2013.01); *G02B 13/0055* (2013.01); *G02B 13/0085* (2013.01)

(58) Field of Classification Search
USPC .................................................. 359/739, 740
See application file for complete search history.

(56) References Cited

U.S. PATENT DOCUMENTS 7,880,981 B2 *   2/2011   Do ................................. 359/784
2010/0073534 A1   3/2010   Yano et al.
2010/0118420 A1   5/2010   Deng et al.

FOREIGN PATENT DOCUMENTS

| EP | 2113800 A1 | 11/2009 |
|----|------------|---------|
| EP | 2 202 796 A1 | 6/2010 |
| WO | 2008/102648 A1 | 8/2008 |
| WO | 2009/158105 A2 | 12/2009 |
| WO | 2010/074743 A1 | 7/2010 |

OTHER PUBLICATIONS

Office Action for corresponding Chinese patent application No. 201180047062.2 mailed Sep. 23, 2014; English translation attached.
International Search Report for corresponding international application No. PCT/NL2011/050479 mailed Oct. 14, 2011.

* cited by examiner

*Primary Examiner* — Jack Dinh
(74) *Attorney, Agent, or Firm* — Wood, Phillips, Katz, Clark & Mortimer

(57) ABSTRACT

The invention relates to an optical unit comprising. The present invention further relates to the use of such an optical unit. Such an optical unit comprises, seen in a direction from the object side to the imaging surface, a first substrate, a first lens element, a second lens element and a second substrate, characterized in that the first substrate includes a diaphragm function.

32 Claims, 3 Drawing Sheets

OPTICAL UNIT

TECHNICAL FIELD

The present invention relates to an optical unit. The present invention further relates to the use of such an optical unit. The optical unit can be regarded as a lens assembly and comprises, seen in a direction from the object side to the imaging surface, a first substrate, a first lens element, a second tens element and a second substrate.

BACKGROUND

International application WO 2009/158105 relates to an imaging module made up of a number of transparent substrates, which substrates are on either side provided with so-called aperture layers, a number of lens elements, wherein said lens is disposed on either side of the aforesaid substrate, such that said aperture layer is embedded between said lens and said substrate, and an image sensor of the pixel array type.

European application No. 2 202 796 in the name of the present applicant relates to an optical unit, comprising, seen in a direction from the object side to the imaging surface, a first substrate, a first lens element, a flat, transparent intermediate layer, a second lens element and a second substrate, which intermediate layer has an optical correction function near the imaging surface.

International application WO 2010/074743 relates to a method for forming an imaging module, wherein a lens stack wafer, a spacer wafer and an image sensor wafer are formed into a module.

US 2010/0118420 relates to an image capture lens comprising a first glass substrate, a first lens material on one side of said substrate and a second lens material on the other side of the substrate.

Optical units are known per se, they are used, inter alia, in camera systems, in relation to which systems an ongoing effort exists to find smaller, lighter, thinner, better and cheaper camera systems. From International application WO 2004/027880 in the name of the present applicant, for example, there is known a camera system comprising an image capturing element, a lens element for imaging an object at the image capturing element, a spacer for maintaining a predetermined distance between the lens element and the image capturing element, whilst furthermore a tens substrate is provided for carrying the lens. From U.S. Pat. No. 6,985,307 there is furthermore known a lens assembly wherein it is indicated that the optical length, which is defined as the distance between the object side of the imaging lens to the imaging surface of a CCD or the like, must be small. Such a lens is frequently also referred to as a compact lens, wherein, for example in a mobile phone, the optical length must be at least less than the thickness of the telephone itself. The lens must furthermore be configured so that the image obtained with such a lens be visually acceptable. U.S. Pat. No. 6,985,307 thus provides a lens assembly made up of a first lens element, a second lens element and a third lens element, which lens elements must meet special requirements as regards their curvature, the relative spacing between the lens elements and the thickness of the lens elements used. From International application WO 2008/011003 there is furthermore known a camera system comprising three substrate layers with five optical elements formed thereon.

The camera modules used in mobile telephones require increasingly more resolution and optical functionalities within ever decreasing dimensions. Thus, there is a need for the development of new lens systems comprising lens elements having a greater sag height, sometimes referred to as deeper lenses elements, which lens elements must have at least the same dimensional precision as the prior lens elements. The present applicant has found that, using the current production methods, significant efforts are required in order to control the intended dimensional precision with the increasingly deep lens elements.

SUMMARY OF THE INVENTION

Thus it is an object of the present invention to provide an optical unit in which the desired dimensional precision of the lens system can be achieved without the dimensions of the optical unit increasing undesirably.

Another object of the present invention is to provide an optical unit, viz. a lens assembly, in which the nominal performance and the performance after tolerances are in equilibrium.

The invention as described in the introduction is characterised in that the first substrate includes a diaphragm function.

According to the present inventor it has been found to be possible, using such an optical unit, to manufacture a system of lens elements in which the specific location of the diaphragm function, viz. in the first substrate, provides an optimum equilibrium between the nominal performance and the performance after tolerances. Optical systems in which the diaphragm function is located at an essentially different position, for example between the substrate and a lens element present on the substrate, score insufficiently in the field of performance after tolerances, or insufficiently in the field of nominal performance.

The present invention in particular relates to the presence of the diaphragm function within the substrate, in which the diaphragm is therefore embedded between the material of which the substrate is composed. Such an embodiment should not be confused with, for example, FIG. 2a of WO 2009/158105, in which structure the diaphragm function is positioned on either side of the transparent substrate, which structure is essentially different from the structure used in the present optical unit.

In a special embodiment of the present invention, it is desirable that the first substrate can be regarded as a substrate consisting of at least two separate units, wherein the diaphragm function is obtained by applying a coating to the surface of one unit, such that an aperture is formed on said surface, which unit is connected to the at least other unit(s) in such a manner that the diaphragm function is located at a position within the first substrate thus composed. Connecting the units preferably takes place by means of an adhesive, a radiation-curable adhesive or a thermally curable adhesive.

The term "coating" is to be understood to mean any layer that is capable of performing a diaphragm function. Such a layer must in particular screen light at the required position, so that the incident light on the substrate can pass the substrate at a desired position. The function of the diaphragm can be described as blocking the passage of light, with the exception of the light that passes through the aperture. If the substrate is made up of two separate units, the diaphragm function will be located between the aforesaid two separate units, viz. within the substrate made up of the aforesaid two separate units. Preferably it is desirable that the aforesaid two separate units be made of the same material, in particular be durably interconnected, for example via an adhesive layer. If desired, such a substrate may additionally be provided with additional layers, for example a glass layer, but also an infrared filter, a diaphragm or aperture, or a lens layer, on one or both sides.

In a special embodiment, a flat transparent intermediate layer may be disposed between the first lens element and the second lens element, which intermediate layer has an optical correction function near the imaging surface, as a result of which it has been found to be possible to use relatively less deep lens elements in comparison with an optical unit in which such a transparent intermediate layer is not used. It should be noted in this regard that the transparent intermediate layer thus used does not have a lens function as such, but that the path of rays of the light is influenced by the thickness of the intermediate layer itself and the index transition between air and the refractive index of the material of the intermediate layer itself.

In a special embodiment it is desirable that the flat intermediate layer be made of glass.

In a special embodiment of the present invention it is desirable that a third lens element abuts the first substrate at a position remote from the first lens element, in particular that a fourth lens element abuts the second substrate, seen in the direction of the imaging surface.

In a special embodiment it is desirable that the first, the second, the third and the fourth lens element have an Abbe number in the 20-80 range and a refractive index in the 1.4-1.7 range. The first, the second, the third and the fourth lens element may have the same Abbe number and the same refractive index, but in specific embodiments it is desirable that one or more of the aforesaid lens elements have different Abbe number and refractive index values.

In a special embodiment it is desirable that the flat intermediate layer be configured as a layer built up of several layers, as a result of which the optical performance of the optical unit can thus be influenced in dependence on what is needed.

Optical correction functions near the imaging surface include: an anti-reflection function, an infrared filter function and a diaphragm function.

To obtain a stable and dimensionally precise connection of the intermediate layer both to the first lens element and to the second lens element it is preferable to use an adhesive, which adhesive is in particular selected from the group of UV curable and thermally curable adhesives.

In the optical unit according to the present invention, the third lens element is preferably a plano convex lens, the first lens element is a plano concave lens, the second lens element is a plano concave lens and the fourth lens element is a plano convex lens, whilst it is in particular preferable for the fourth lens element to be a plano convex/concave lens.

In a special embodiment of the optical unit, a diaphragm may be disposed between the third lens element and the first substrate, or an aperture may be present between the first substrate and the first lens element. Furthermore, embodiments are conceivable in which an additional layer, viz. a diaphragm or an infrared filter, is present on either side of the second substrate.

Both the first and the second substrate used in the present optical unit comprise in particular a transparent glass plate, in which connection it can furthermore be noted that in a specific embodiment the glass used for the first and the second substrate is preferably different from the glass used for the intermediate layer. In a special embodiment, the second substrate at the same time functions as a sensor screening plate.

Suitable glass types for the substrate include glass types having a refractive index in the 1.2-2.2 range and an Abbe number in the 20-90 range. The glass types used for the substrates may be the same or different, but the applicable Abbe number and refractive index values must fall within the aforesaid ranges.

In a special embodiment of the present invention it is desirable that the second substrate also includes a diaphragm function. Like the above-described first substrate, the second substrate may also comprise at least two or more separate units, which units are interconnected in such a manner that the aforesaid diaphragm function is included in the substrate.

The intermediate layer used in the present optical unit preferably has a thickness of 0.2-10 mm.

The present inventors have found that the object aimed at can be accomplished in particular if the first, the second, the third and the fourth lens element are formed on the first and the second substrate, respectively, by using a replication method, wherein the substrates may already be provided with certain layers, for example a diaphragm, an infrared filter, a UV filter. Using the replication method it has been found to be possible in particular to manufacture lenses which have a precisely predictable curvature. Using such a method and a flat intermediate layer, it has furthermore been found to be possible to replicate lenses exhibiting a high degree of dimensional precision on said flat intermediate layer.

The present optical unit can be used in particular in image processing units where small dimensions are essential, for example in camera units for mobile telephones, personal computers, digital cameras, surveillance cameras and the like, in which a CCD or CMOS is used.

Using the present invention, it has been found to be possible to combine polymers and glass, using a polymer for the first, the second, (possibly) the third and (possibly) the fourth lens elements, whilst a glass material is used for the first and the second substrate and also for the intermediate layer, if present. Thus, lens designs having a low sag height on relatively thick substrates are used. An additional advantage is that flat glass plates can be worked with a high degree of precision, in particular by replicating a polymer lens on such a surface.

The present invention will now be explained in more detail by means of a number of examples, in which connection it should be noted, however, that the present invention is by no means limited to such embodiments.

DETAILED DESCRIPTION OF THE DRAWING

Figure 1:
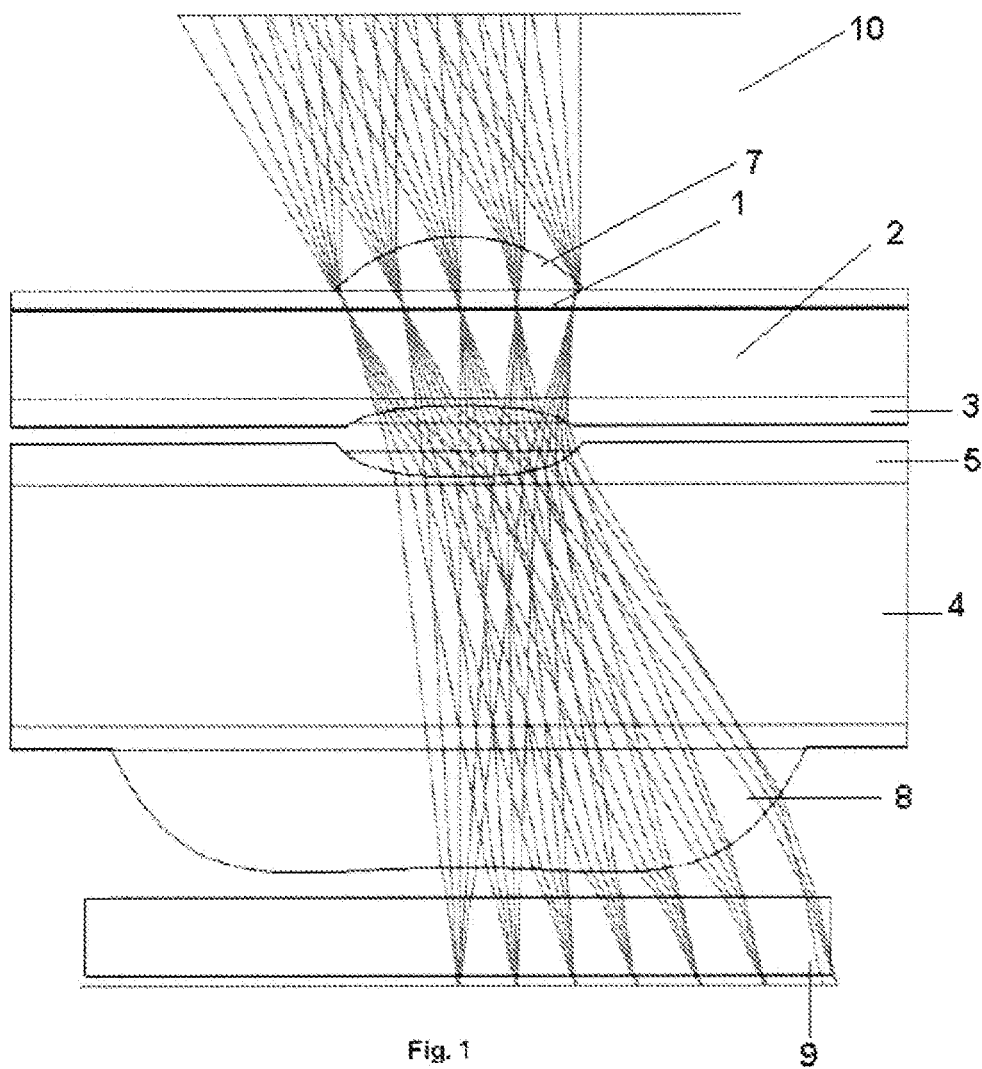
FIG. 1 shows an optical unit according to the prior art.

The optical unit 10 shown in FIG. 1 comprises, seen in the direction from the object side to the imaging surface, a first substrate 2, on which a lens or lens element 3 is disposed, which lens 3 abuts against a lens or lens element 5, which lens 5 is disposed on the second substrate 4. Furthermore, a third lens or lens element 7 is provided, which is disposed on the first substrate 2, as well as a fourth lens or lens element 8, which is disposed on the second substrate 4. The figure also schematically shows the path of rays through the optical unit 10, which rays are captured on an image sensor 9 (CMOS, for example). An image sensor of the pixel array type may be used as the image sensor. The diaphragm function, indicated at reference sign 1, which is located at a position between the third lens 7 and the first substrate 2, has been obtained by first applying a coating to the substrate 2 and then placing a lens 7 on the substrate 2 thus provided with diaphragm. The substrate 2 is a transparent glass plate, which does not comprise any optical correction function at all, therefore.

Figure 2:
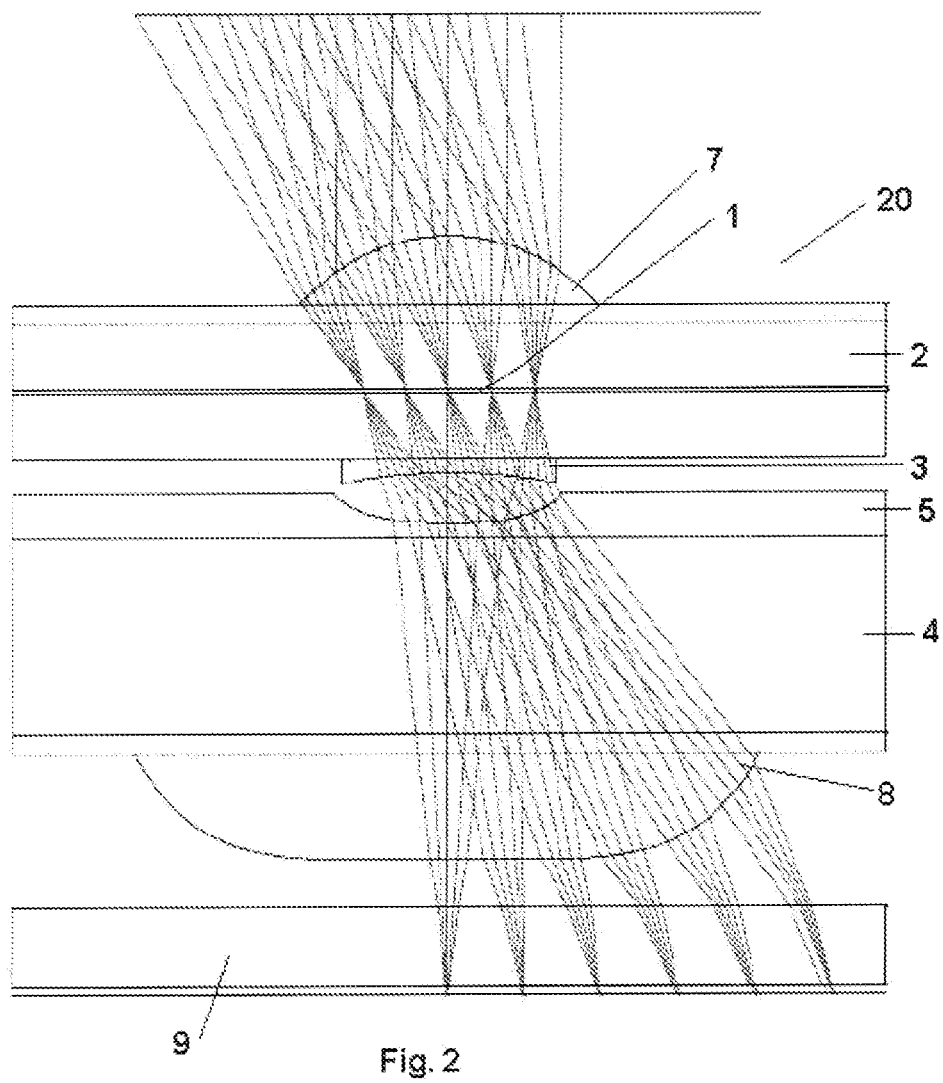
FIG. 2 shows an optical unit according to the present invention.

FIG. 2 schematically shows a path of rays through the optical unit 20 according to the present invention, which unit comprises, seen in a direction from the object side to the imaging surface, a third lens 7, a first substrate 2, a first lens 3, a second lens 5, a second substrate 4 and finally a fourth lens 8, which rays are captured on an image sensor 9 (CMOS, for example). FIG. 2 clearly shows that the diaphragm function, indicated at reference sign 1, is located at a position within the first substrate 2. The first substrate 2 shown in FIG. 2 is made up of two separate elements, which elements are connected by means of an adhesive layer, such that the diaphragm function 7 is present in the first substrate 2. Said diaphragm function is thus fully embedded in the substrate 2. Because of the aforesaid position in the substrate 2, said diaphragm function is not in contact with any other layer, for example a lens element, an infrared filter or other diaphragm layer.

The lens 7 as well as the lens 3 are preferably formed on the first substrate 2 by means of the replication method, which substrate 2 already comprises an internal diaphragm function in this embodiment. The same preference applies as regards the formation of the lens 5 and the lens 8 on the second substrate 4. After said two parts have been formed by means of the replication method, the two parts are permanently bonded together, with an adhesive layer (not shown), preferably selected from the group of UV curable and thermally curable adhesives, being provided between the lens 3 and the lens 5. Subsequently, the whole is cured and an optical unit 20 is obtained. In such an optical unit 20, use is made of glass type Schott B270 both for the first substrate 2 and for the second substrate 4. In a special embodiment is it also possible to provide an intermediate layer (not shown), in particular between the lens 3 and the lens 5, which intermediate layer is durably bonded thereto by means of an adhesive layer. A suitable material for the intermediate layer is Schott D263T. In a special embodiment (not shown) it is also possible to provide one or more IR filters or additional diaphragms or apertures, for example between the substrate and the lens, or even to provide the lens with a coating. The separate elements present in the optical unit 20, such as lenses, substrates, diaphragms, filters, are optically aligned, so that the path of rays incident near the object side will reach the imaging surface. If the resin compositions used for the first, the second, the third and the fourth lens correspond to each other, a refractive index value of 1.565 and an Abbe number of 40.8 will lead to an advantageous optical performance. It is also possible, however, to use the same resin for the third and the fourth lens, with a refractive index value of 1.510 and an Abbe number of 60.0 leading to an advantageous optical performance, in combination with a refractive index value of 1.565 and an Abbe number of 40.8 for the first and the second lens. Said values merely serve by way of example and should not be construed as being limitative.

TABLE 1

(not according to the invention)

| Relative Field | Freq. (lp/mm) | MTF (T/S) | | | |
|---|---|---|---|---|---|
| | | Design (%) | | Best 90% | |
| 0 | ¼ Ny | 71 | 71 | 67 | 67 |
| 8 | ¼ Ny | 65 | 64 | 56 | 57 |
| 0 | ½ Ny | 510 | 510 | 460 | 460 |
| 8 | ½ Ny | 430 | 390 | 320 | 320 |

TABLE 2

(according to the invention)

| Relative Field | Freq. (lp/mm) | MTF (T/S) | | | |
|---|---|---|---|---|---|
| | | Design (%) | | Best 90% | |
| 0 | ¼ Ny | 74 | 74 | 72 | 72 |
| 8 | ¼ Ny | 66 | 70 | 64 | 65 |
| 0 | ½ Ny | 520 | 520 | 500 | 500 |
| 8 | ½ Ny | 430 | 480 | 380 | 410 |

Table 1 and Table 2 show the results of tolerance analysis for the optical system of FIG. 1 and the optical system of FIG. 2, respectively. From the two Tables 1 and 2 it follows that the design shown in FIG. 2, in which a diaphragm function is present within the substrate, provides a more stable solution than does the optical system in which the diaphragm function is present on the substrate.

Figure 3:
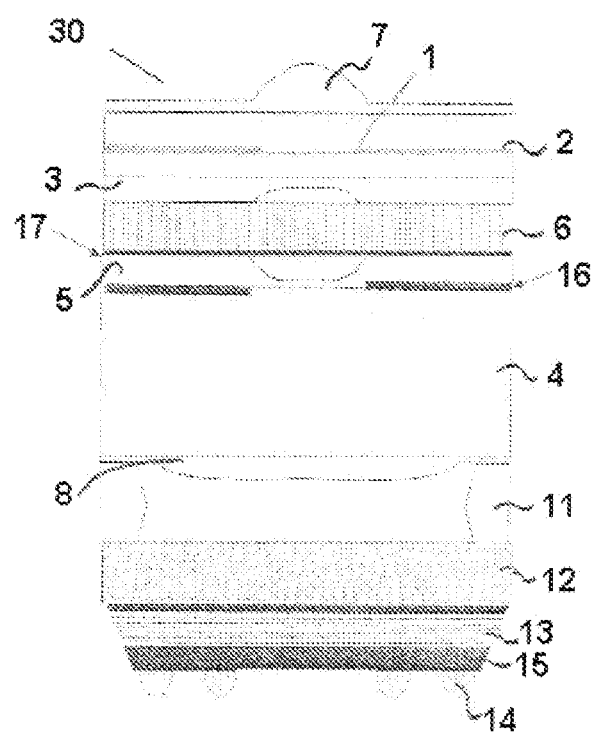
FIG. 3 shows a sensor in which an optical unit according to the present invention is used.

FIG. 3 schematically shows an optical sensor 30 according to the present invention, in which the same reference numerals are used, where applicable, as in the above-discussed FIGS. 1-2. More in particular, a diaphragm 16 is disposed between the lens 5 and the second substrate 4 in the optical unit 30. Such a location for the diaphragm must not be construed as being (imitative to the scope of the present invention, the diaphragm function may also be left out in some embodiments. The presence of a diaphragm 1 in the first substrate 2, however, is an essential element of the present invention. In some embodiments it is possible to include a diaphragm function in the second substrate 4 as well (not shown), analogously to the above-described manner of providing the diaphragm function for the first substrate 2.

The assembly of the lens 7, the first substrate 2, provided with the diaphragm 1, the lens 3, the intermediate layer 6, the lens 5, the second substrate 4 and the lens 8 that is obtained in this manner is placed, via a spacer 11, on an image sensor, comprising a cover plate 12, a colour filter 13, a CMOS layer 15, and a ball grid array 14. Said structure of the image sensor must not be construed as being limitative. The bonding between the spacer 11 and the image sensor on the one hand and the fourth lens 8 on the other hand takes place by means of an adhesive layer (not shown). In a specific embodiment it is desirable that an infrared filter 17 be present on the surface of the intermediate layer 6, positioned between the lens 5 and the intermediate layer 6. An advantage of such a construction is that the lens 5 can be replicated on a "clean" second substrate. The present inventors have found that replicating a lens on a substrate provided with an infrared filter may lead to curvature problems. Thus it is desirable in some embodiments that the infrared layer already be present on the intermediate layer 6, which infrared layer will in that case directly abut the lens 5.

What is claimed is:

1. An optical unit comprising, seen in a direction from the object side to the imaging surface, a first substrate, a first lens element, a second lens element and a second substrate, characterised in that the first substrate comprises a transparent glass plate and includes a diaphragm function, wherein said first substrate consists of at least two separate units, in which said diaphragm function is located between and in contact with said at least two separate units.

2. An optical unit according to claim 1, characterised in that the diaphragm function is obtained by applying a coating to the surface of one unit, such that an aperture is formed on said surface, which unit is connected to the at least other unit(s) in such a manner that the diaphragm function is located at a position within the first substrate thus composed.

3. An optical unit according to claim 2, characterised in that connecting said separate units takes place by using an adhesive.

4. An optical unit according to claim 1, characterised in that a third lens element abuts the first substrate at a position remote from the first lens.

5. An optical unit according to claim 4, characterised in that a fourth lens element abuts the second substrate, seen in the direction of the imaging surface.

6. An optical unit according to claim 5, characterised in that the fourth lens element is a plano convex lens.

7. An optical unit according to claim 6, characterised in that the fourth lens element is a combined plano concave/convex lens.

8. An optical unit according to claim 5, characterised in that the first, the second, the third and the fourth lens element are formed on the first and the second substrate, respectively, by using a replication method.

9. An optical unit according to claim 5, characterised in that the first, the second, the third and the fourth lens element have an Abbe number in the 20-80 range and a refractive index in the 1.4-1.7 range.

10. An optical unit according to claim 9, characterised in that the first, the second, the third and the fourth lens element have the same Abbe number and the same refractive index.

11. An optical unit according to claim 4, characterised in that the third lens element is a plano convex lens.

12. An optical unit according to claim 4, characterised in that a diaphragm is disposed between the third lens element and the first substrate.

13. An optical unit according to claim 1, characterised in that the second substrate also includes a diaphragm function.

14. An optical unit according to claim 1, characterised in that a flat intermediate layer is disposed between the first lens element and the second lens element, which intermediate layer has a correction function near the imaging surface.

15. An optical unit according to claim 14, characterised in that said flat intermediate layer is made of glass.

16. An optical unit according to claim 14, characterised in that said flat intermediate layer may comprise several layers.

17. An optical unit according to claim 14, characterised in that said flat intermediate layer has an anti-reflection function.

18. An optical unit according to claim 14, characterised in that said flat intermediate layer has an infrared filter function.

19. An optical unit according to claim 14, characterised in that said flat intermediate layer has a diaphragm function.

20. An optical unit according to claim 14, characterised in that the intermediate layer is bonded to the first lens element and the second lens element by means of an adhesive.

21. An optical unit according to claim 20, characterised in that the adhesive is selected from the group of UV curable and thermally curable adhesives.

22. An optical unit according to claim 14, characterised in that the intermediate layer has a thickness of 0.2-10 mm.

23. An optical unit according to claim 1, characterised in that the first lens element is a plano concave lens.

24. An optical unit according to claim 1, characterised in that the second lens element is a plano concave lens.

25. An optical unit according to claim 1, characterised in that an aperture is present between the first substrate and the first lens element.

26. An optical unit according to claim 1, characterised in that the second substrate comprises a transparent glass plate.

27. An optical unit according to claim 26, characterised in that the glass used for the first and the second substrate is different from the glass used for the intermediate layer.

28. An optical unit according to claim 1, characterised in that the first and the second substrate have an Abbe number in the 20-90 range and a refractive index in the 1.2-2.2 range.

29. An optical unit according to claim 1, characterised in that the second substrate at the same time functions as a sensor screening plate.

30. An optical unit according to claim 1, characterised in that the first substrate can be regarded as two separate units, which two separate units are connected in such a manner that the diaphragm function is located in the first substrate, between said two separate units.

31. An optical unit according to claim 30, characterised in that said separate units are made of the same material.

32. A method of using an optical unit as defined in claim 1, in an image processing unit, in particular a camera unit.

\* \* \* \* \*